L. BEMELMANS.
Coke-Oven.

No. 214,086.  Patented April 8, 1879.

WITNESSES:
W. J. Hollingsworth
Edw. W. Byrn.

INVENTOR:
L. Bemelmans
BY
ATTORNEYS.

UNITED STATES PATENT OFFICE.

LEON BEMELMANS, OF KANAWHA COURT-HOUSE, WEST VIRGINIA.

IMPROVEMENT IN COKE-OVENS.

Specification forming part of Letters Patent No. 214,086, dated April 8, 1878; application filed November 30, 1878.

*To all whom it may concern:*

Be it known that I, LEON BEMELMANS, of Kanawha Court-House, in the county of Kanawha and State of West Virginia, have invented a new and Improved Coke-Oven; and I do hereby declare that the following is a full, clear, and exact description of the same, reference being had to the accompanying drawings, forming part of this specification, in which—

Figure 3:
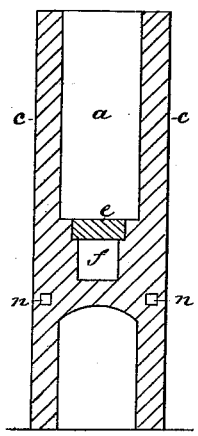
Figure 4:
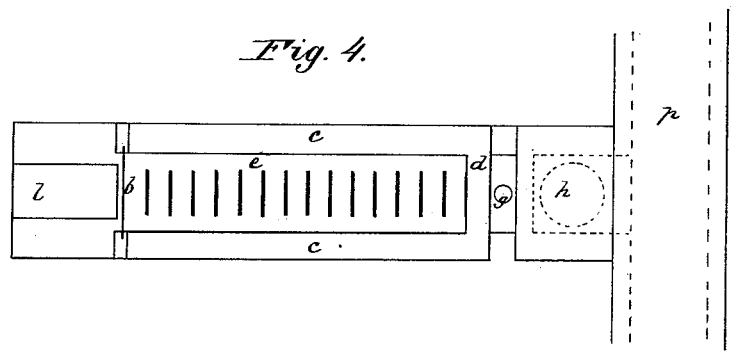
Figure 1:
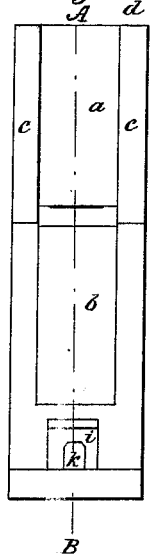
Figure 2:
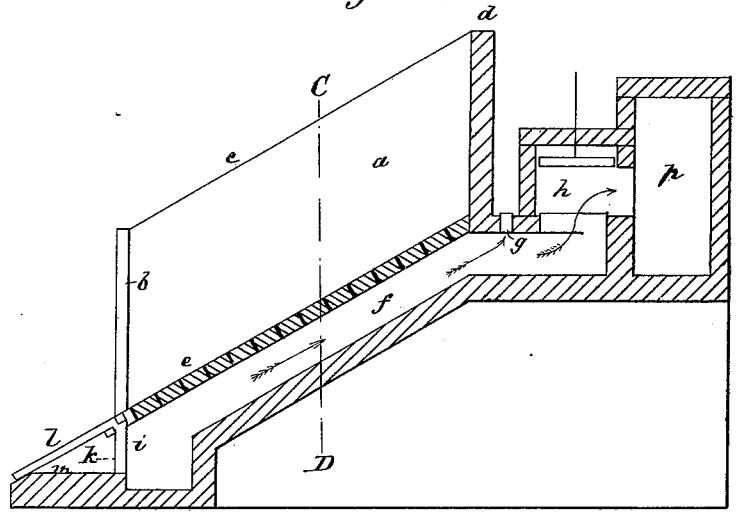

Figure 1 is a front view of the oven. Fig. 2 is a longitudinal vertical section through the line A B, Fig. 1. Fig. 3 is a cross-section through the line C D, Fig. 2. Fig. 4 is a plan view.

The invention relates to coke-ovens, in which the gases produced by distillation and by partial combustion are collected as fuel for use in other apparatus.

The invention consists in a coke-oven having its top open throughout its length, and having an inclined bottom with a door at the lower end for discharging its contents from gravity, and a perforated false bottom and subjacent flue for carrying off the gases.

The invention also consists in the combination of valves and doors for controlling and operating the oven, as hereinafter fully described.

In practice I shall use the oven-battery; but for purposes of illustration I have shown but one, in which $a$ is the chamber in which the solid coal is converted into gaseous fuel and coke. As shown in the longitudinal section, Fig. 2, the floor $e$ of that chamber is inclined from twenty-five to forty-five degrees, according to the nature of the residue, so that this residue will empty itself by opening gate $b$ at the lower end of oven.

The oven proper or chamber, $a$, is inclosed by two longitudinal and vertical walls, $c$ $c$, and by the back wall $d$. The lower end is closed by the iron gate $b$, and the top remains open. The length of the chamber $a$, measured on the line of dip, may vary, say, from fifteen to thirty feet, but the width between walls should not be much more than three feet, and may be less. The inclined floor $e$ of chamber $a$ is made of fire-clay tiles, leaving between each other passages for the gas to a flue, $f$, left under the tiles, and leading the gas to either of the valves $g$ and $h$, located outside of the oven. The valve $g$, of six or eight inches diameter, opens into the atmosphere, and may be capped with a small iron chimney. The valve $h$, of two or more feet in diameter, opens or closes the communication between flue $f$ and the general leader $p$, which collects the gas of the whole battery. In this general leader, and past the battery, is established a steam-jet blower, (not shown,) which is regulated to produce a blast that gives motion to the gas in the required direction.

The lower end of flue $f$ is shut with a tile, $i$, in which is made a door, $k$, for cleaning the flue. Door $k$ is protected by a sheet-iron apron, $l$, which continues the inclined plane over the recess $m$. A depression at the lower end of the flue $f$ allows the tar and dust to accumulate before it becomes necessary to clean the flue.

In the foundations are left channels $n$ $n$ for drying the masonry and for the passage of the lower rods binding the masonry.

The mode of working is as follows: Valve $h$ being closed, some wood is put upright against door $b$, and the oven $a$ receives the charge of coal. Valve $g$ is opened, the small chimney is adjusted over opening $g$, and the wood is kindled. This soon inflames the coal, and the place left by the burning wood is filled with coke. When the smoke issuing from valve $g$ contains too little oxygen to burn, valve $g$ is closed, valve $h$ is opened, and the fire gains rapidly. As the coal is converted into coke the surface is covered with fine wet coke, as in the process of coking in open pits. When all the coal is coked valve $h$ is closed, gate $b$ is raised, and the coke, in a mass, slides down the incline and out of the oven. With very bituminous coals it happens that the coke, while pasty, wedges between the tiles of floor $e$. In that case, before opening gate $b$, and after closing valve $h$, the valve $g$ and door $k$ are opened, which allows the coke caught in said recesses to be soon burned out, after which door $k$ and valve $g$ are closed and gate $b$ is opened, and the mass slides down. Gate $b$ is then closed, and a new charge of coal is loaded in the oven.

In making use of my coke-oven, I may employ it as a gas-generator—such, for instance, as is used for making gas-fuel for Siemens' regenerative furnace.

In defining my invention with greater clearness, I would state that I am aware that a coke-oven has been constructed in the form of a retort curved from a vertical position at its upper end to a horizontal position at its lower end for discharging its load of coke from gravity. I therefore do not claim, broadly, an inclined coking-chamber. In the case referred to, however, the retort is open only at its ends, and not throughout its length, and the closed character of the chute which the curved retort forms permits it to become choked up with the charge of coke, while my inclined coking-chamber, open at the top throughout its length, is not subject to this objection.

On the other hand, I am aware that an inclined open-top coke-oven has been heretofore constructed, but this had no door at its lower end to permit the automatic dumping of the charge from gravity.

Having thus described my invention, what I claim is—

1. A coke-oven having its coking-chamber open at the top throughout its entire length, and provided with an inclined bottom, with a removable door at the lower end of the same, substantially as described.

2. A coke-oven consisting of an inclined receptacle, $a$, having a slotted or perforated bottom, and subjacent flue $f$, in combination with valve $g$ and valve $h$, substantially as described.

3. The oven having door $b$ and inclined perforated bottom, $e$, forming a subjacent flue, in combination with the door $k$, opening into said flue, and a detachable apron, $l$, continuing the incline of the bottom $e$ over the said door $k$, substantially as shown and described.

LEON BEMELMANS.

Witnesses:
JAMES E. MIDDLETON,
RICHARD HARTE.